United States Patent
Iwata

[11] Patent Number: 5,876,168
[45] Date of Patent: Mar. 2, 1999

[54] THREAD FORMS FOR PREVENTING DISENGAGEMENT BETWEEN MALE AND FEMALE SCREWHEADS

[75] Inventor: Yukichi Iwata, Shinagawa-ku, Japan

[73] Assignee: Iwata Bolt Kabushiki Kaisha, Tokto-to, Japan

[21] Appl. No.: 726,043

[22] Filed: Oct. 7, 1996

[30] Foreign Application Priority Data

Oct. 9, 1995 [JP] Japan ................................ 7-261593

[51] Int. Cl.⁶ ............................ F16B 39/20; F16B 35/04
[52] U.S. Cl. ............................................ 411/308; 411/411
[58] Field of Search ............................ 411/411, 363, 411/308, 309, 310

[56] References Cited

U.S. PATENT DOCUMENTS

| 3,323,402 | 6/1967 | Gowen | 411/411 |
| 3,433,117 | 3/1969 | Gowen | 411/411 |
| 5,580,199 | 12/1996 | Suzuki | 411/308 |

FOREIGN PATENT DOCUMENTS

| 92686 | 6/1938 | Sweden | 411/307 |

*Primary Examiner*—Flemming Saether
*Attorney, Agent, or Firm*—Ladas & Parry

[57] ABSTRACT

The present invention provides a male screwthread that does not loosen. In a male screwthread that has a thread ridge formed on an outer peripheral surface of an axial portion and a head portion that forms a tool mating means at one end of this axial portion, loosening and return between the male screwthread and a female screwthread is prevented (self-locking) by a configuration in which the thread ridge thereof is formed to have a major diameter that is larger than a reference value and the half-angle of the head-portion side of the thread ridge is formed to be less than 30 degrees.

1 Claim, 1 Drawing Sheet

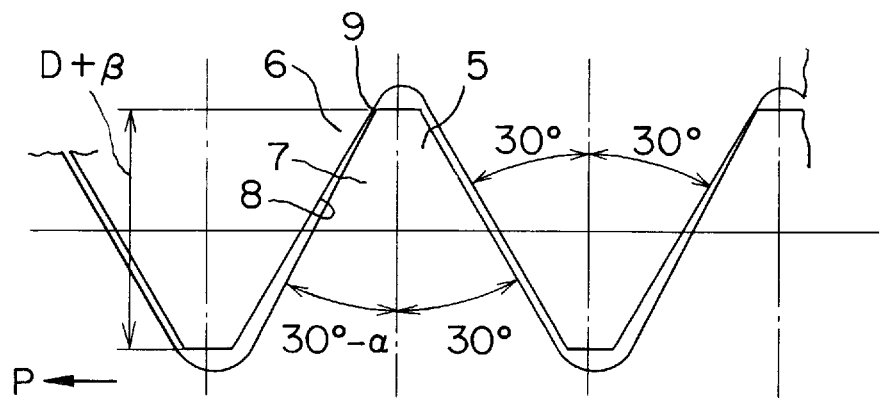
F I G. 1
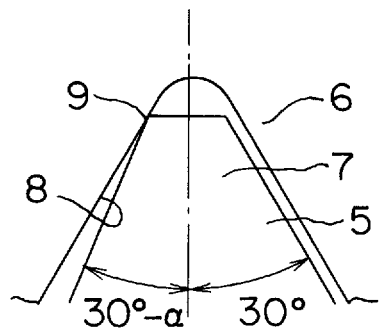
F I G. 2
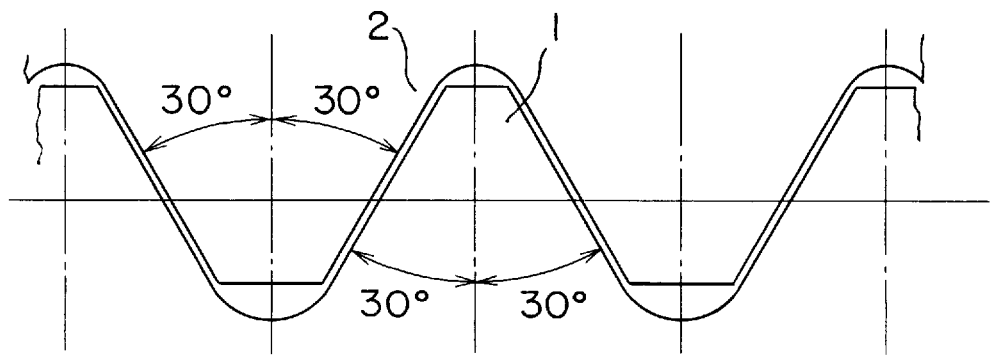
F I G. 3

THREAD FORMS FOR PREVENTING DISENGAGEMENT BETWEEN MALE AND FEMALE SCREWHEADS

BACKGROUND OF THE INVENTION

1. Technical Field of the Invention

The present invention relates to a male screwthread that is configured in such a manner that loosening and return are prevented (self-locking) when the screwthread is engaged with a female screwthread.

2. Related Technical Information

As shown in FIG. 3, a male screwthread 1 and a female screwthread 2 conforming to metric screw regulations used in the conventional art are each formed to have a thread angle of 60 degrees, distributed symmetrically with a half-angle of 30 degrees with respect to a plane perpendicular to the axis thereof. One known method (self-locking) of preventing loosening and return is to ensure that deformation occurs in a plurality of thread ridges of the female screwthread, to provide buffer-zones between the female screwthread and the male screwthread.

However, when a tightening load is applied to male and female threads conforming to the metric screw regulations, elastic deformation of the thread ridges of the male screwthread is greater than elastic deformation of the thread ridges of the female screwthread, so that the surface pressures generated in both the flank surfaces subjected to the load are not even. When the flank surfaces of the thus configured male and female screwthreads deform elastically in contact with one another, the center of action of the load is biased towards the root sides thereof. This reduces the torque radius, giving rise to a problem in that it becomes easy for loosening to occur between the male or female screwthread and the other screwthread. Deformation of the thread ridge of the female screwthread leads difficulties in manufacture, which causes problems involving increased costs.

The present invention was devised in the light of the above problem, with the objective of providing a male screwthread that does not cause loosening or return (self-locking) when engaged.

SUMMARY OF THE INVENTION

In order to solve the above described problem with the conventional art, the present invention concerns a male screwthread having a thread ridge formed on an outer peripheral surface of an axial portion and a head portion that forms a tool mating means at one end of this axial portion. The male screwthread is characterized in that loosening and return between the male screwthread and a female screwthread is prevented by a configuration in which the thread ridge is formed to have a major diameter that is larger than a corresponding diameter of the female screwthread and the half-angle of the head-portion side of the thread ridge is formed to be less than 30 degrees.

BRIEF DESCRIPTION OF THE DRAWINGS

FIG. 1 is an illustrative view of a male screwthread in accordance with a first embodiment of the present invention, in a state in which it is engaged with a female screwthread, FIG. 2 is an illustrative view of a state in which a male screwthread is tightened with respect to a female screwthread; and FIG. 3 is an illustrative view of a conventional male screwthread in a state in which it is engaged with a female screwthread.

DETAILED DESCRIPTION OF PREFERRED EMBODIMENT

A male screwthread 5 that is an embodiment of the present invention will now be described with reference to FIG. 1.

This male screwthread 5 is shaped in such a manner that the half-angle toward a head portion P thereof is a very small angle $\alpha$ less than 30 degrees (i.e., it is: 30 degrees $-\alpha$), whereas the half-angle on the side opposite to the head portion P is 30 degrees. The major diameter of the thread ridges is formed to be a very small length $\beta$ more than a reference major diameter D (i.e., it is: D+$\beta$).

A female screwthread 6 is shaped to have a thread angle of 60 degrees, distributed symmetrically with a half-angle of 30 degrees with respect to a plane perpendicular to the axis thereof, with a major diameter that is the same as the reference major diameter.

Since the male screwthread 5 of this invention is configured in the above manner, the major diameter of the male screwthread 5 is greater than that of the female screwthread 6 and the thread half-angle toward the head portion is (30 degrees$-\alpha$). Thus, when the male screwthread 5 engages with the female screwthread 6, the contact between the male screwthread 5 and the female screwthread 6 occurs toward a root portion of the female screwthread 6, as shown in FIG. 1. If the tightening torque is gradually increased from this state so that the tightening force becomes bigger, a thread ridge 7 of the male screwthread 5 deforms elastically and comes into contact with a root portion 8 of the female screwthread 6, as shown in FIG. 2, and a contact portion 9 therebetween becomes sequentially larger. Therefore, the engagement state between the male screwthread 5 and the female screwthread 6 is such that the contact first occurs at the root portion 8 of the female screwthread 6. The thread ridge 7 of the male screwthread 5 is then supported elastically by the opposing female screwthread 6, and thus a strong loosening-prevention effect can be obtained with respect to external vibrations.

TABLE 1

Values of Return Torque for M2 Machine Screw Tightened to 2 kgf-cm

| | (kgf-cm) | |
|---|---|---|
| Testpiece No. | Male Screwthread | Nylon-Covered Machine Screw |
| 1 | 1.83 | 1.27 |
| 2 | 1.74 | 1.06 |
| 3 | 1.91 | 1.22 |
| 4 | 1.86 | 1.38 |
| 5 | 1.63 | 1.10 |
| X | 1.79 | 1.20 |
| R | 0.28 | 0.32 |

TABLE 2

Values of Return Torque for M3 Machine Screw Tightened to 8 kgf-cm

| | (kgf-cm) | |
|---|---|---|
| Testpiece No. | Male Screwthread | Nylon-Covered Machine Screw |
| 1 | 7.31 | 6.77 |
| 2 | 7.74 | 7.13 |
| 3 | 7.30 | 7.04 |

TABLE 2-continued

Values of Return Torque for M3 Machine Screw
Tightened to 8 kgf-cm

| Testpiece No. | (kgf-cm) | |
|---|---|---|
| | Male Screwthread | Nylon-Covered Machine Screw |
| 4 | 7.55 | 6.93 |
| 5 | 7.61 | 7.28 |
| X | 7.50 | 7.03 |
| R | 0.44 | 0.51 |

Tables 1 and 2 above show the results of tests comparing a loosening-preventing (self-locking) machine screw that is one type of male screwthread in accordance with the present invention and the screwthread of a commonly used machine screw, in a state in which it has been coated with nylon to prevent loosening. Table 1 shows values of return torque when an M2 machine screw has been tightened to 2 kgf-cm while Table 2 shows values of return torque when an M3 machine screw has been tightened to 8 kgf-cm. The average value in each table is denoted by X and the dispersion thereof is denoted by R. It is clear from Tables 1 and 2 that the male screwthread 5 of this invention has a loosening-preventing (self-locking) function that has the effect of increasing the value of return torque and decreasing the dispersion, in comparison with a commonly used type of nylon-coated machine screw.

Since the male screwthread of the above described invention is shaped in such a manner that the major diameter of the thread ridges is larger than a reference value and also the half-angle toward the head portion thereof is smaller than 30 degrees, the major diameter portion of the male screwthread comes into contact with the root portion of the female screwthread as the screw is tightened. The engagement between the male and female screwthreads occurs at the root portion of the female screwthread, even when an axial load is generated. Thus the present invention provides an inexpensive, highly reliable male screwthread that is not subject to loosening or return.

What is claimed is:

1. A kit comprising a male screwthread and a female screwthread, said male screwthread comprising a thread angle that comprises first and second half-angles, said first half-angle being closer to a head of the male screwthread than the second half-angle and being less than 30 degrees, said second half-angle being 30 degrees, said male screwthread comprising thread ridge means for contacting and elastically deforming against a root portion of the female screwthread when the male screwthread is engaged with the female screwthread and a tightening force is applied between the male screwthread and the female screwthread, said thread ridge means comprising a thread ridge that contacts the root portion of the female screwthread and only the root portion when the male screwthread is engaged with the female screwthread, said thread ridge having a width that is less than a width of the female screwthread, measured at a point where the thread ridge contacts the female screwthread, both before and after engagement of the male screwthread with the female screwthread.

* * * * *